United States Patent
Ono et al.

(10) Patent No.: US 9,016,114 B2
(45) Date of Patent: Apr. 28, 2015

(54) METHOD OF MEASURING STEAM TURBINE, MEASURING DEVICE, AND METHOD OF MANUFACTURING STEAM TURBINE

(71) Applicant: Kabushiki Kaisha Toshiba, Minato-ku Tokyo (JP)

(72) Inventors: Yasunori Ono, Yokohama (JP); Tetsuya Yamanaka, Yokohama (JP); Kentaro Takagi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 13/785,068

(22) Filed: Mar. 5, 2013

(65) Prior Publication Data
US 2013/0233064 A1  Sep. 12, 2013

(30) Foreign Application Priority Data
Mar. 6, 2012 (JP) .................................. 2012-049143

(51) Int. Cl.
*G01M 15/14* (2006.01)
*F01D 1/00* (2006.01)
*F01D 25/26* (2006.01)
*F01D 25/28* (2006.01)

(52) U.S. Cl.
CPC ................. *G01M 15/14* (2013.01); *F01D 1/00* (2013.01); *F01D 25/26* (2013.01); *F01D 25/285* (2013.01); *F05D 2220/31* (2013.01); *F05D 2260/80* (2013.01)

(58) Field of Classification Search
USPC .............................. 73/112.01, 112.02, 112.03
See application file for complete search history.

(56) References Cited

U.S. PATENT DOCUMENTS

| | | | |
|---|---|---|---|
| 4,757,716 A * | 7/1988 | Nottingham et al. | 73/623 |
| 4,864,862 A * | 9/1989 | Nottingham et al. | 73/623 |
| 6,487,922 B1 * | 12/2002 | Bauer et al. | 73/865.8 |
| 6,965,834 B2 | 11/2005 | Saito et al. | |
| 8,640,531 B2 * | 2/2014 | Remillard et al. | 73/112.01 |
| 8,683,851 B2 * | 4/2014 | McCarvill | 73/112.01 |
| 8,713,999 B2 * | 5/2014 | Hatcher | 73/112.01 |
| 2013/0014571 A1 * | 1/2013 | Quinones et al. | 73/112.05 |
| 2013/0192353 A1 * | 8/2013 | Hatcher | 73/112.01 |
| 2013/0269426 A1 * | 10/2013 | Remillard et al. | 73/112.01 |
| 2014/0125791 A1 * | 5/2014 | Arellano et al. | 348/82 |
| 2014/0208159 A1 * | 7/2014 | Soorianarayanan et al. | 714/27 |

FOREIGN PATENT DOCUMENTS

| | | |
|---|---|---|
| EP | 1 408 201 A2 | 4/2004 |
| JP | 2002-259466 | 9/2002 |
| JP | 2004-132245 | 4/2004 |
| JP | 2009-278757 | 11/2009 |
| JP | 2010-121499 | 6/2010 |

* cited by examiner

*Primary Examiner* — Eric S McCall
(74) *Attorney, Agent, or Firm* — Finnegan, Henderson, Farabow, Garrett & Dunner, L.L.P.

(57) ABSTRACT

A method of measuring a steam turbine according to an embodiment has: installing a measuring device into the inside of the steam turbine through an inspection hole or a manhole of the steam turbine or an inspection hole or a manhole of a condenser connected to the steam turbine, when the steam turbine is halted; and measuring a position and a dimension of an axial key or a center key of the steam turbine by using the measuring device, without opening a turbine casing of the steam turbine.

19 Claims, 6 Drawing Sheets

FIG. 7
FIG. 8
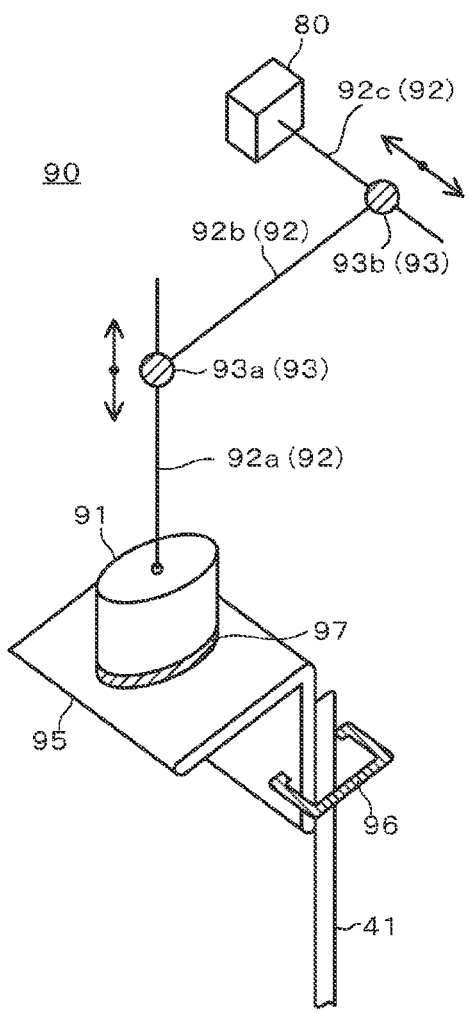
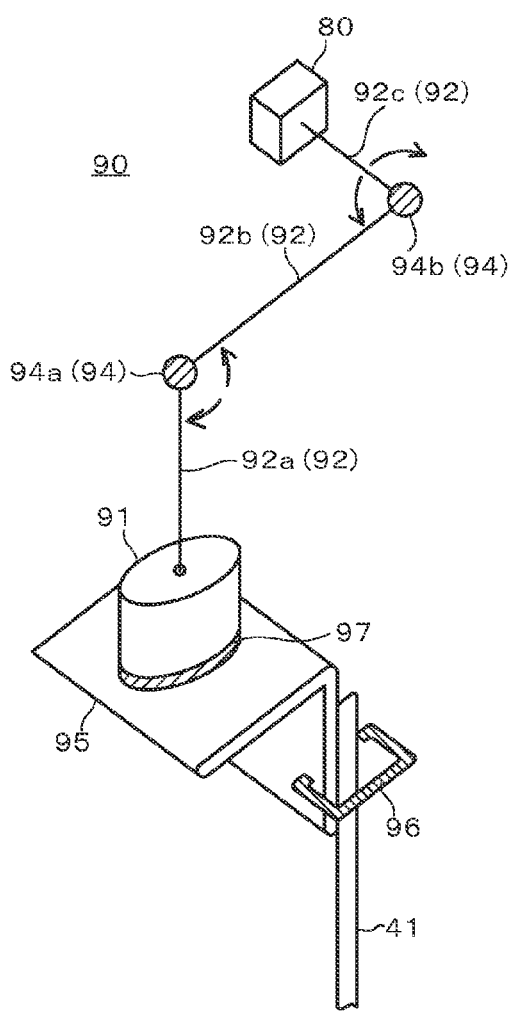

METHOD OF MEASURING STEAM TURBINE, MEASURING DEVICE, AND METHOD OF MANUFACTURING STEAM TURBINE

CROSS REFERENCE TO RELATED APPLICATION

This application is based upon and claims the benefit of priority from the prior Japanese Patent Application No. 2102-049143, filed on Mar. 6, 2012; the entire contents of which are incorporated herein by reference.

FIELD

Embodiments described herein relate generally to a method of measuring a steam turbine, a measuring device, and a method of manufacturing a steam turbine.

BACKGROUND

Technology of a steam turbine has remarkably developed aiming at the bigger capacity and the higher efficiency. The technology thereof is also applied to improvement/maintenance of the steam turbine, to enhance reliability, performance, and efficiency of the existing steam turbine.

In order to improve/maintain power generation equipment such as steam turbine, reverse engineering (acquiring information such as a shape of existing equipment and designing/manufacturing a component or an instrument based thereon) is commonly used. Some of technologies for acquiring information such as shapes of existing equipment are published.

As described above, in improving/maintaining the steam turbine, a component or an instrument is sometimes designed/produced based on inspected/measured data of the existing steam turbine so that the component or the instrument to which up-to-date technology is applied can comply with the existing steam turbine.

However, in order to inspect/measure the existing steam turbine, it is necessary to open casing(s) of the steam turbine and to halt operation of the steam turbine for a long period of time.

BRIEF DESCRIPTION OF THE DRAWINGS

FIG. 7 is a diagram showing detail of a tool 90.
FIG. 8 is a diagram showing detail of the tool 90.

DETAILED DESCRIPTION

A method of measuring a steam turbine according to an embodiment has: installing a measuring device into the inside of the steam turbine through an inspection hole or a manhole of the steam turbine or an inspection hole or a manhole of a condenser connected to the steam turbine, when the steam turbine is halted; and measuring a position and a dimension of an axial key or a center key of the steam turbine by using the measuring device, without opening a turbine casing of the steam turbine.

Hereinafter, the embodiment will be described in detail with reference to the drawings.

(Steam Turbine System 10)

FIG. 1 to FIG. 4 are schematic diagrams showing a steam turbine system 10 according to the embodiment. The steam turbine system 10 has a steam turbine 20 and a condenser 30, and generates electric power by driving a generator (not shown) connected to the steam turbine 20 by steam from a nuclear reactor, a steam generator, or the like. The steam fed to the steam turbine 20 is condensed to water in the condenser 30 and is fed to the steam turbine again through the steam generator.

Figure 1:
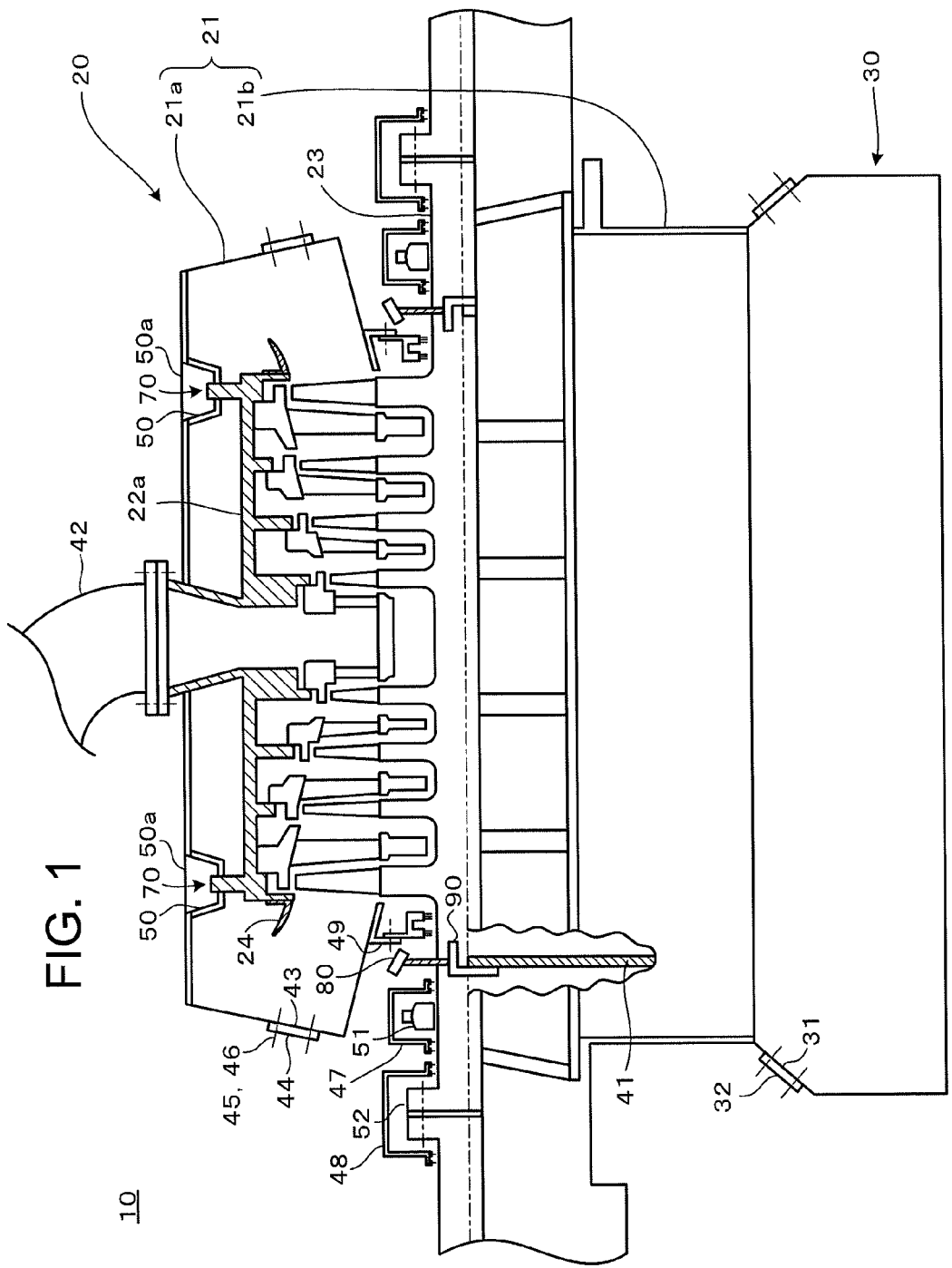
FIG. 1 is a cross section drawing showing a steam turbine system 10 according to an embodiment.
Figure 3:
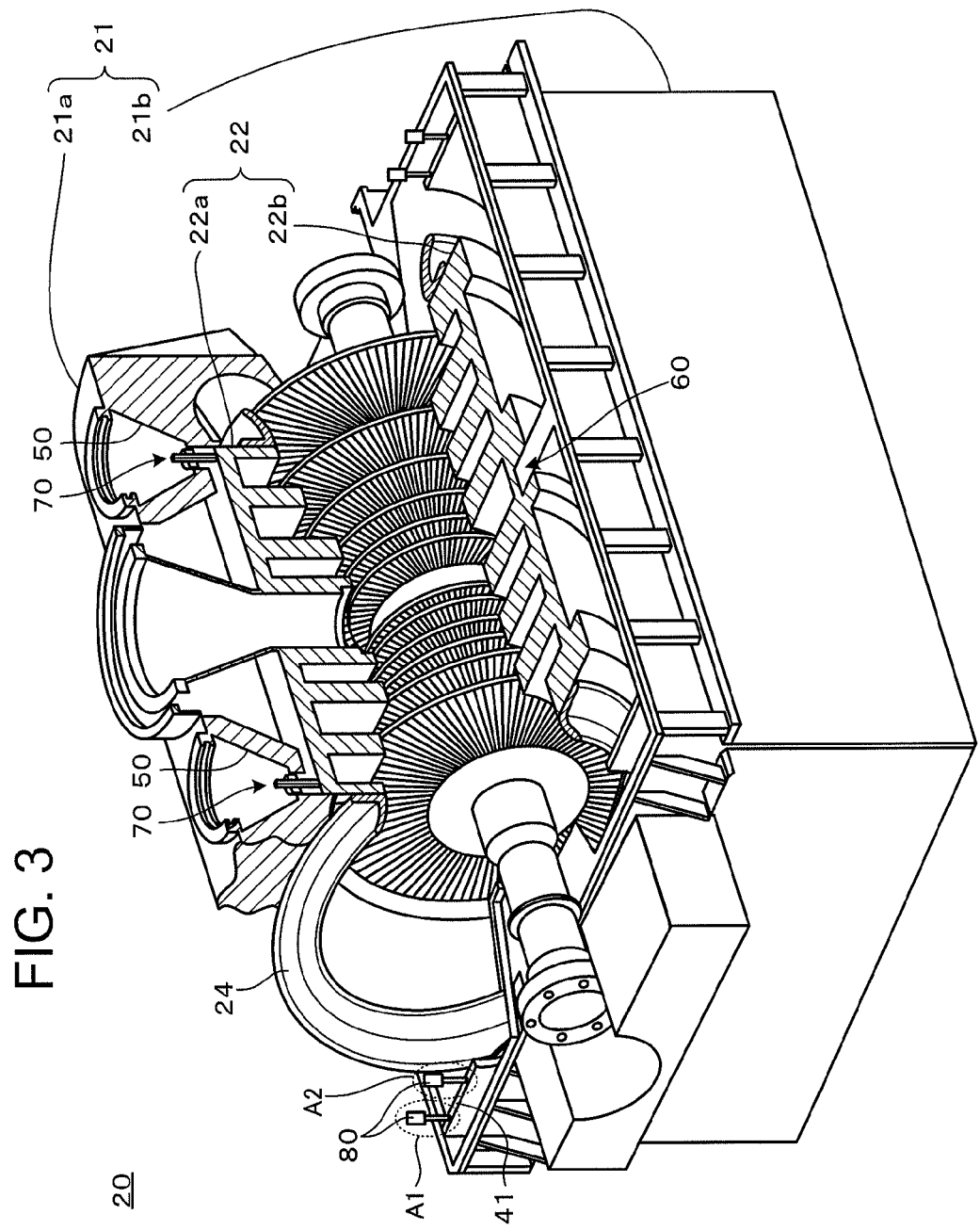
FIG. 3 is a schematic diagram showing the steam turbine system 10.
Figure 4:
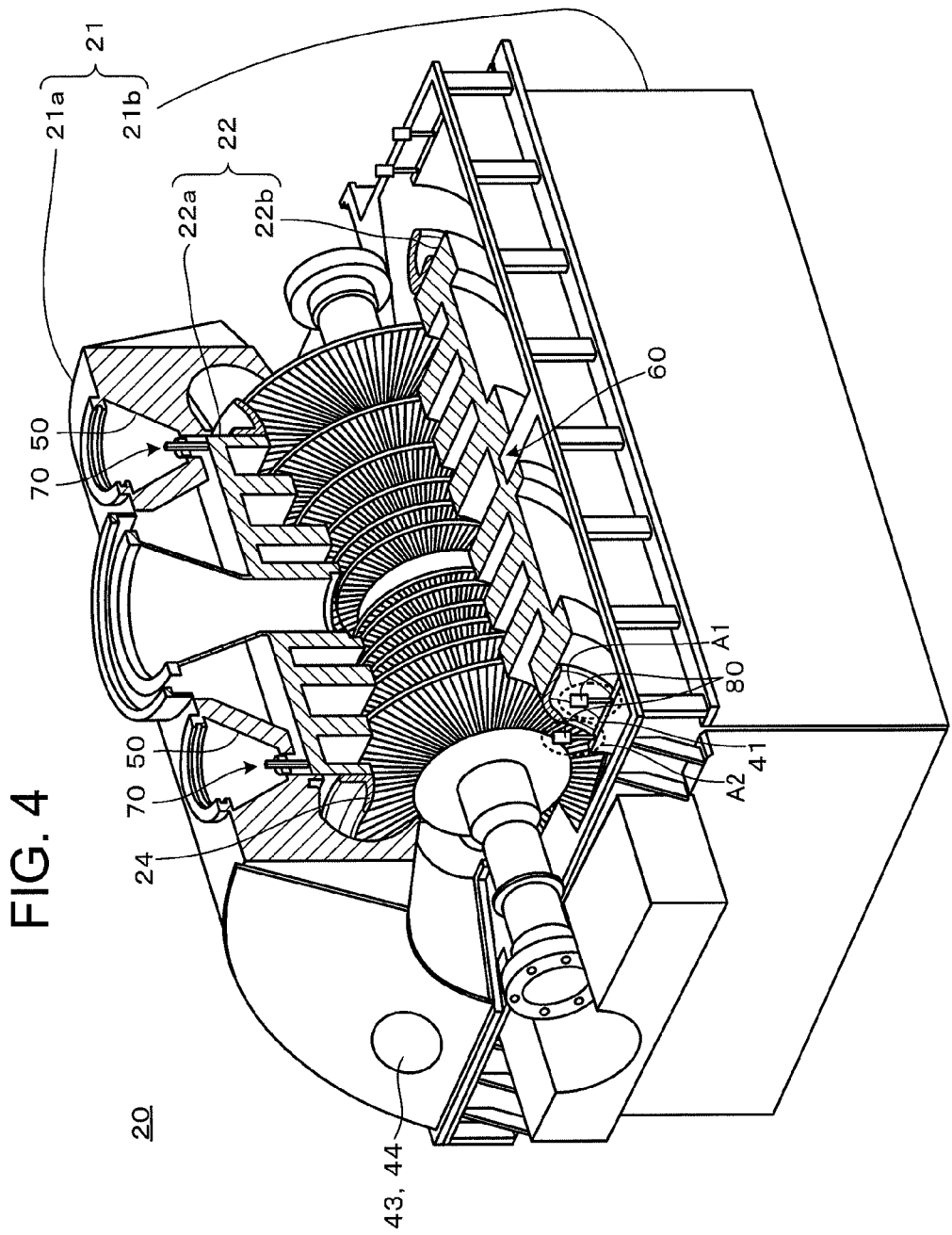
FIG. 4 is a schematic diagram showing the steam turbine system 10.

As shown in FIG. 1, FIG. 3, and FIG. 4, the steam turbine 20 has a turbine outer casing 21, a turbine inner casing 22, a turbine rotor 23, and a flow guide 24.

As shown in FIG. 1 and FIG. 3, the turbine outer casing 21 is sectioned into a turbine outer casing upper half 21a and a turbine outer casing lower half 21b, and holds the turbine inner casing 22 and the turbine rotor 23 from above and below.

In order to reinforce the turbine outer casing 21, a turbine casing rib 41 is equipped inside the turbine outer casing 21.

In order to flow steam into the inside of the steam turbine 20, a crossover pipe 42 is connected to the turbine outer casing 21.

Figure 2:
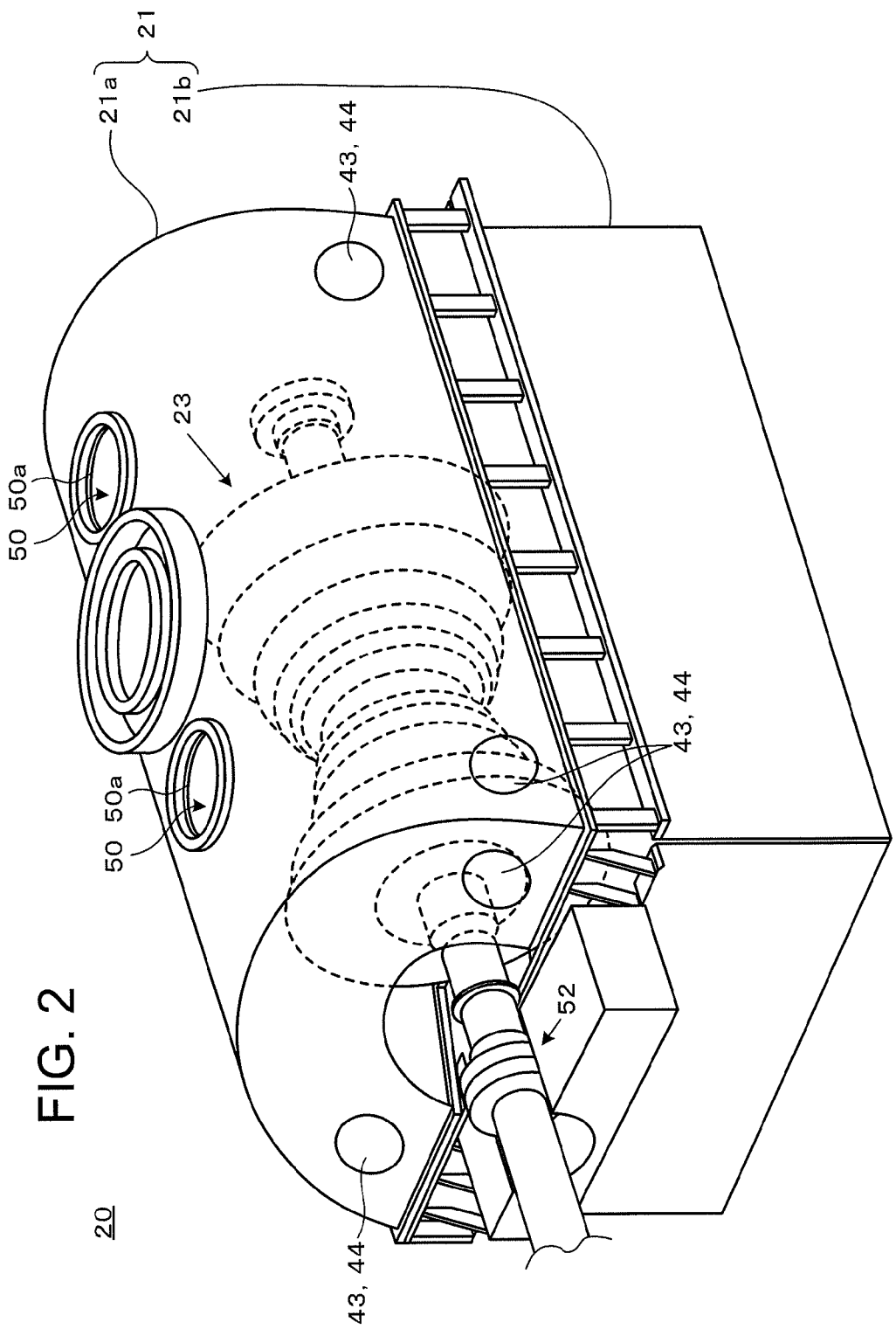
FIG. 2 is a schematic diagram showing the steam turbine system 10.

A turbine inspection hole 43 for inspecting the inside of the steam turbine 20 is provided in the turbine outer casing 21. It is general that the turbine inspection hole 43 is positioned, as shown in FIG. 2, at the front/back or right/left of the steam turbine 20. The turbine inspection hole 43 is usually closed by an inspection hole cover 44 and the inspection hole cover 44 is opened at a time of inspection, enabling internal inspection of the steam turbine 20 through the turbine inspection hole 43. As shown in FIG. 1, as a result that a bolt hole 46 provided in the turbine outer casing 21 and a bolt 45 are engaged, the inspection hole cover 44 is attached to the turbine outer casing 21.

A bearing cover 47 and a coupling guard 48 for protecting later-described bearing 51 and turbine rotor coupling 52 are attached to the turbine outer casing 21. In addition, a packing casing 49 for installing a packing therein is attached to the turbine outer casing 21.

As shown in FIG. 1 to FIG. 4, the turbine outer casing 21 has a safety hole 50. The safety hole 50 is an opening for discharging steam inside the steam turbine 20 into the atmosphere when a pressure inside the steam turbine 20 rises excessively, and is usually closed by a safety valve 50a. The safety valve 50a opens as necessary, and steam is discharged into the atmosphere. A later-described center key mechanism 70 is disposed inside the safety hole 50.

As shown in FIG. 3 and FIG. 4, the turbine inner casing 22 is sectioned into a turbine inner casing upper half 22a and a turbine inner casing lower half 22b, and encloses the turbine rotor 23 from above and below.

As shown in FIG. 1, the turbine rotor 23 is rotated by steam flow through the crossover pipe 42 and drives a generator (not shown). The turbine rotor 23 is supported by the turbine outer casing lower half 21b in a rotatable manner by the bearing 51. The turbine rotor 23 is connected to the generator (not shown) by the turbine rotor coupling 52.

As shown in FIG. 1 and FIG. 3, the flow guide 24 is held inside the turbine outer casing 21 and connected to the turbine inner casing 22. The flow guide 24 has an opening whose internal diameter becomes larger from an entrance side to an exit side of steam, and functions as a diffuser to inflate steam having been used for rotation of the turbine rotor 23. The steam having passed through the flow guide 24 is fed to the condenser 30. As shown in FIG. 3 and FIG. 4, it is preferable that a measuring device 80 is installed in a range A2 which is close in some degree to a later-described central axis of the flow guide 24 (central axis of the turbine rotor 23).

The condenser 30 cools the steam discharged from the steam turbine 20 and compresses the steam (water condensation). The water is returned to the nuclear reactor, the steam generator, or the like, and then is fed to the steam turbine again.

As shown in FIG. 1, a condenser inspection hole 31 for inspecting the inside of the condenser 30 is equipped outside of the condenser 30. The condenser inspection hole 31 is usually closed by an inspection hole cover 32, and the inspection hole 32 is opened at a time of inspection, enabling internal inspection of the condenser 30 through the condenser inspection hole 31.

As shown in FIG. 3 and FIG. 4, for the sake of positioning of the turbine outer casing 21 and the turbine inner casing 22, an axial key mechanism 60 and the center key mechanism 70 are provided.

The axial key mechanism 60 is disposed between a side portion of an inner side of the turbine outer casing 21 and a side portion of an outer side of the turbine inner casing 22.

Figure 5:
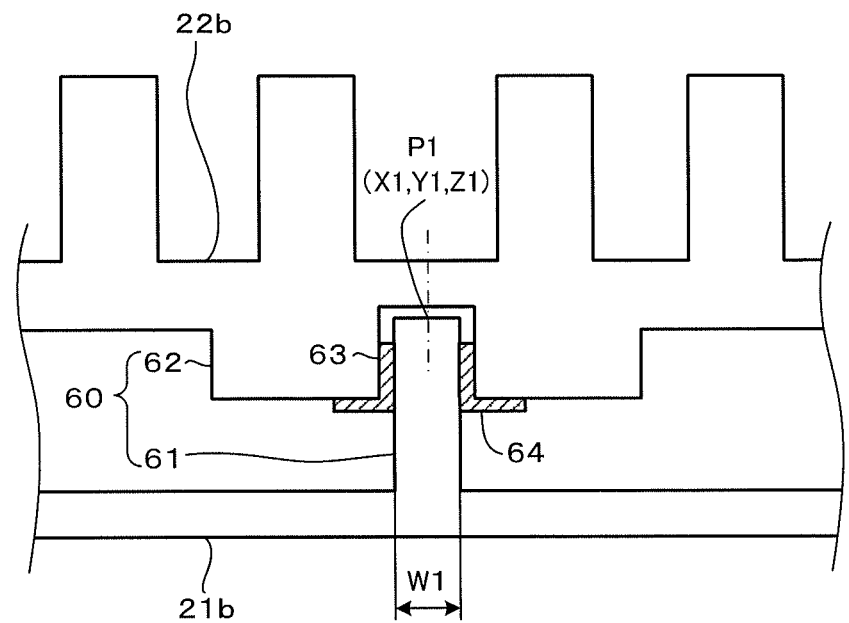
FIG. 5 is a top surface view showing an axial keymechanism 60.

FIG. 5 is a top surface view indicating a state of the axial key mechanism 60 viewed from upward. The axial key mechanism 60 can be constituted by a combination of an axial key 61 and a key groove member 62. As a result that the axial key 61 and the key groove member 62 are engaged, positioning of the turbine outer casing 21 and the turbine inner casing 22 is performed.

The axial key 61 is a plate-shaped projection and is engaged with a groove 63 of the key groove member 62. An adjustment jig 64 of L-shape is disposed between the axial key 61 and the key groove member 62. This is for absorbing a difference in dimension (width (thickness), in particular) between the axial key 61 and the groove 63.

As will be described later, a position (a position P1 (x1, y1, z1) at a top center, in particular) and a dimension (a width (thickness) W1 of the axial key 61, in particular) of the axial key 61 are measured by the measuring device 80. Basically, if the position and the dimension of the axial key 61 are known, it is possible to fabricate the turbine inner casing 22 having the key groove member 62 corresponding to the axial key 61. In other words, in the existing steam turbine 20, it becomes easy to design/produce a turbine inner casing 22 and a turbine rotor 23 for replacement in advance. The position and the dimension of the axial key 61, as well as a position and a dimension of a later-described center key 71, are quite important elements for adjusting the turbine inner casing 22 to the turbine outer casing 21.

In FIG. 5, the axial key 61 and the key groove member 62 are formed in the turbine outer casing 21 (21*b*) and the turbine inner casing 22 (22*b*), respectively. It is possible that, contrarily to the above, the axial key 61 and the key groove member 62 are formed in the turbine inner casing 22 and the turbine outer casing 21, respectively.

As shown in FIG. 1, FIG. 3, and FIG. 4, the center key mechanisms 70 is disposed between a lower half of an inner side of the turbine outer casing upper half 21*a* and an upper half of an outer side of the turbine inner casing upper half 22*a*.

Figure 6:
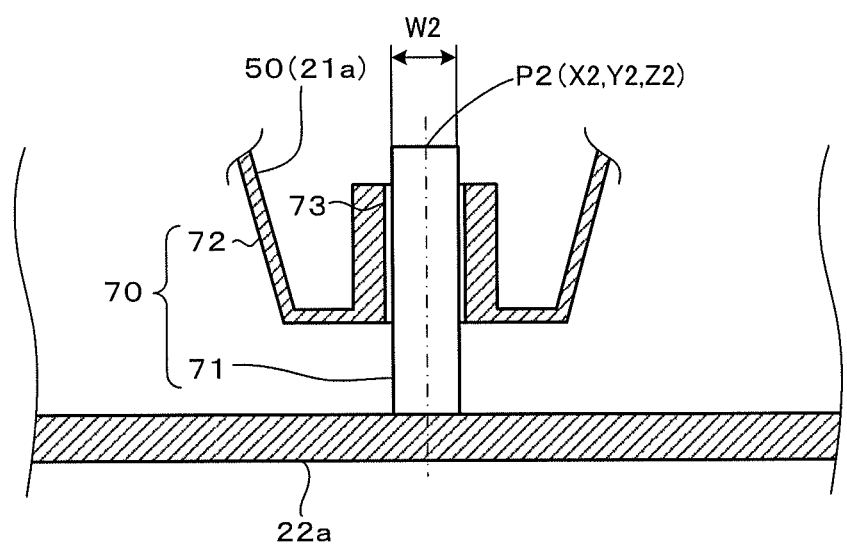
FIG. 6 is a partial cross-sectional view showing a center key mechanism 70.

FIG. 6 is a partial cross-sectional view showing a state of the center key mechanism 70 viewed from the front or the rear. The center key mechanism 70 can be constituted by a combination of the center key 71 and a key groove member 72. As a result that the center key 71 and the key groove member 72 are engaged, positioning of the turbine outer casing 21 and the turbine inner casing 22 is performed.

The center key 71 is a projection of a pillar shape (for example, a quadrangular prism shape), and is engaged with a through hole 73 of the key groove member 72. The key groove member 72 has an almost cylindrical shape, and has the through hole 73 of a pillar shape (for example, a quadrangular prism shape). The key groove member 72 is attachable/detachable to/from the turbine outer casing 21*a*.

As will be described later, a position of the center key 71 (a position P2 (x2, y2, z2) at a top center, in particular) and a dimension (a width W2 of the center key 71, in particular) are measured by the measuring device 80. Basically, if the position and the dimension of the center key 71 are known, it is possible to fabricate the turbine inner casing 22 having the center key 71. In other words, in an existing steam turbine 20, it becomes easy to design/produce a turbine inner casing 22 and a turbine rotor 23 for replacement in advance. In addition, by processing a size of the through hole 73 of the key groove member 72, positional deviation of the turbine outer casing upper half 21*a* and the turbine inner casing upper half 22*a* can be absorbed. The position and the dimension of the center key 71, as well as the position and the dimension of the axial key 61, are quite important elements for adjusting the turbine inner casing 22 to the turbine outer casing 21.

In FIG. 6, the center key 71 and the key groove member 72 are formed in the turbine inner casing 22 and the turbine outer casing 21, respectively. It is possible that, contrarily to the above, the center key 71 and the key groove member 72 are formed in the turbine outer casing 21 and the turbine inner casing 22, respectively.

(Checking and Inspecting Method of Steam Turbine System 10)

Hereinafter, a checking/inspecting method of the steam turbine system 10 according to this embodiment will be described.

(1) Installation of Measuring Device 80 Inside Steam Turbine 20

As shown in FIG. 1, FIG. 3, and FIG. 4, the measuring device 80 is installed inside the steam turbine 20 through the turbine inspection hole 43 provided in the turbine outer casing 21 or the condenser inspection hole 31 provided outside of the condenser 30.

(2) Measurement by Measuring Device 80

As shown in FIG. 5, the position (the position P1 (x1, y1, z1) at the top center, in particular) and the dimension (the width (thickness) W1 of the axial key 61, in particular) of the axial key 61 or the like are measured by the measuring device 80.

Based on the position and dimension of the axial key 61 or the like, the turbine inner casing 22 or the like is designed/produced.

Here, the measuring device 80 can be of either contact type or non-contact type. As non-contact type measuring devices 80, a laser scanner and an infrared camera can be cited.

The laser scanner has a laser light source, a scan mechanism scanning laser light emitted from the laser light source, and a light receiving unit receiving the laser light reflected from an object. The laser scanner receives the laser light reflected from the object and measures a distance to the object. By measuring the distance to the object while scanning the laser light, it is possible to measure a three-dimensional shape of the object.

The infrared camera has an image sensor receiving infrared light emitted from an object, and can store a shape of the object as an image. By obtaining a plurality of images of the object by changing a positional relationship between the infrared camera and the object, a three-dimensional shape of the object can be measured.

As the contact type measuring device 80, an arm-type three-dimensional measuring instrument can be cited. The arm-type three-dimensional measuring instrument can measure a three-dimensional shape of an object by operating an arm and making a tip of the arm contact the object.

Further, as shown in FIG. 1, FIG. 3, and FIG. 4, the measuring device 80 can be directly fixed to a strength member such as a turbine casing rib 41, or to the bolt 45 or the bolt hole 46 of the turbine inspection hole 43, or can be fixed via a tool 90.

On this occasion, the coupling guard 48 and the bearing cover 47 which are installed outside the turbine outer casing 21 as shown in FIG. 1 are disassembled and the turbine rotor coupling 52 and the bearing 51 are checked/measured by the non-contact type measuring device such as a laser scanner or an infrared camera, or by the contact-type measuring device such as an arm-type three-dimensional measuring instrument. In such checking/measurement, a vernier caliper, a measuring tape, or the like can be used.

Similarly, a component and an instrument such as a crossover pipe 42 and a packing casing 49 which are connected to the turbine casing are checked/measured by the non-contact type measuring device such as a laser scanner or an infrared camera, or by the contact-type measuring device such as an arm-type three-dimensional measuring instrument. In such checking/measurement, a vernier caliper, a measuring tape, or the like can be used. Thereby, information necessary for reverse engineering can be obtained.

FIG. 3 and FIG. 4 show examples of cases where non-contact type measuring devices are used.

As shown in FIG. 3, when the axial key mechanism 60 (axial key 61) performing positioning of the turbine outer casing 21 and the turbine inner casing 22 is to be measured, a contact type measuring device cannot be used since a structure such as a flow guide 24 and the like interferes. Thus, as the measuring device 80, a non-contact type measuring device is used.

Here, if the measuring device 80 (non-contact type measuring device) is installed in a range A2 close to the turbine inspection hole 43 (a range which is close in some degree to a center axis of the flow guide 24 (a center axis of the turbine rotor 23), the turbine rotor 23 side), a structure such as a flow guide 24 interfering, measurement of the axial key mechanism 60 (axial key 61) is not be able to be performed. In other words, the flow guide 24 or the like intercepts between the measuring device 80 and the axial key mechanism 60 (axial key 61).

On the other hand, if the measuring device 80 (non-contact type measuring device) is installed in a range A1 close to the turbine inspection hole 43 (a range which is far from the center axis of the flow guide 24 (center axis of the turbine rotor 23), the turbine inspection hole 43 side), the axial key mechanism 60 (axial key 61) is able to be measured without receiving interference of the structure such as a flow guide 24.

When the measuring device 80 is installed in the range A1 close to the turbine inspection hole 43, the structure such as a flow guide 24 interferes, and the center key mechanism 70 (center key 71) is not be able to be measured, either. In contrast, when the measuring device 80 is installed in the range A2 far from the turbine inspection hole 43, the center key mechanism 70 (center key 71) is able to be measured without receiving interference of the structure such as a flow guide 24.

Incidentally, as a delimiter dividing the ranges A1 and A2 (turbine inspection hole 43 side and turbine rotor 23 side), a middle of a shortest straight line connecting a center of the turbine inspection hole 43 and the center axis of the turbine rotor 23 can be a reference. In other words, the ranges A1 and A2 (turbine inspection hole 43 side and turbine rotor side 23) can be discriminated by whether the ranges A1 and A2 is far from or close to the center axis of the turbine rotor 23, in relation to a distance between the aforementioned middle and the center axis of the turbine rotor 23.

FIG. 7 and FIG. 8 are schematic diagrams of tools 90. The tools 90 are constituted by support tables 91, arms 92 (92a, 92b, 92c), prismatic joints 93 (93a, 93b), and rotating joints 94 (94a, 94b), and support the measuring devices 80 at arbitrary positions.

The support table 91 is fixed to a strength member (the turbine casing rib 41 or the like) of the turbine casing of the steam turbine 20, to the bolt 45 or the bolt hole 46 provided in the turbine inspection hole 43, the inspection hole cover 44, or a manhole of the steam turbine 20.

As shown in FIG. 7, an end of the arm 92a is connected to the support table 91. The prismatic joint 93a is connected to the other end of the arm 92a. An end of the arm 92b is connected to the prismatic joint 93a. The prismatic joint 93b is connected to the other end of the arm 92b. An end of the arm 92c is connected to the prismatic joint 93b. The measuring device 80 is connected to the other end of the arm 92c.

The prismatic joint 93a moves linearly on the arm 92a. Further, the prismatic joint 93b moves linearly on the arm 92c. In other words, by driving the prismatic joints 93a, 93b, the position of the measuring device 80 can be changed.

As shown in FIG. 8, with regard to the rotating arm 94a, an angle between the arms 92a and 92b cab be changed. In addition, with regard to the rotating joint 94b, an angle between the arms 92b, 92c can be changed. That is, by driving the rotating joints 94a, 94b, the position of the measuring device 80 can be changed.

It should be noticed that only one of the prismatic joint 93 and the rotating joint 94 can be used or both thereof can be used.

Further, as shown in FIG. 7 and FIG. 8, the support table 91 can be directly fixed to the strength member such as a turbine casing rib 41, or to the bolt 45 or the bolt hole 46 of the turbine inspection hole 43, or can be fixed by using an angle plate 95 or a C-clamp 96. The support table 91 can have a magnet 97.

As described above, the steam turbine 20 can be checked/measured as below.

(1) The non-contact type measuring device such as a laser scanner or an infrared camera, or the contact type measuring device such as an arm-type three-dimensional measuring instrument is installed in through the turbine inspection hole 43, the condenser inspection hole 31, or the manhole provided in the turbine outer casing 21 or the condenser 30, and the component or the instrument (the axial key 61, the center key 71, or the like) inside the turbine outer casing 21 or the turbine inner casing 22 is checked/measured.

(2) Since interference of various structures inside the steam turbine 20 is to be avoided in checking/measuring the component or the instrument, it is necessary to dispose the measuring device 80 at a proper position in order to secure visibility or proximity. The measuring device 80 can be fixed to the strength member (the turbine casing rib 41 or the like) inside the turbine outer casing 21, or to the bolt 45 or the bolt hole 46 of the turbine inspection hole 43, the condenser inspection hole 31, or the manhole, via a tool 90.

Incidentally, it is also possible to enter the inside of the turbine outer casing 21 from the turbine inspection hole 43 or the manhole provided in the turbine outer casing 21 thereby to check/measure the component or the instrument inside the turbine outer casing 21 by a vernier caliper, a measuring tape, or the like.

(3) The coupling guard 48 or the bearing cover 47 which are disposed outside the turbine outer casing 21 are decomposed and the turbine rotor 23 or the bearing 51 is checked/measured by the non-contact type measuring device such as a laser scanner or an infrared camera, or by the contact-type measuring device such as an arm-type three-dimensional measuring instrument. It should be noted that checking/measurement can be also performed by the vernier caliper, the measuring tape, or the like.

(4) The component or the instrument such as a crossover pipe 42 or a packing casing 49 which is connected to the turbine outer casing 21 is checked/measured by the non-contact type measuring device such as a laser scanner or an infrared camera, or by the contact-type measuring device such as an arm-type three-dimensional measuring instrument. Checking/measurement can be also performed by a vernier caliper, a measuring tape, or the like.

According to this embodiment, the following becomes possible in improving/maintaining a steam turbine.

(1) It becomes possible to check/measure an existing steam turbine 20 without opening casing(s) of the steam turbine 20. Consequently, a shut-down period of the steam turbine 20 due to checking/measurement is shortened. Consequently, it is possible to curtail a cost necessary for opening the casing (s) of the steam turbine 20 and a loss of electric power sales due to halt of the steam turbine 20.

(2) Checking/measurement of the steam turbine 20 at a relatively short interval becomes possible.

For the steam turbine 20, two types of inspection, large-scale inspection at a relatively long interval and small-scale inspection at a relatively short interval, are performed. The large-scale inspection is inspection of the entire steam turbine 20, the inspection requiring opening of the casing of the steam turbine 20. In contrast, the small-scale inspection is inspection of a part of the steam turbine 20 (for example, periodical inspection of a steam valve), the inspection not requiring opening of the casing of the steam turbine 20. By a measuring method according to this embodiment, inspection/measurement of a component or an instrument (axial key 61, a center key 71, or the like) inside the casing of the steam turbine 20 becomes possible in the small-scale inspection.

(3) In improving or marinating the steam turbine 20, a component or an instrument in which latest technology is used can be provided without loosing time.

This is because a component or an instrument which requires a relatively long manufacturing period, such as a turbine rotor 23 or a casing, can be replaced at a time of next regular inspection of the steam turbine 20.

(4) The measuring method according to this embodiment can contribute to energy conservation and prevention of global warming. This is because improvement/maintenance of the steam turbine 20 leading to efficiency improvement of the steam turbine 20 can be performed sooner than in a case of a conventional method.

As described above, according to this embodiment, improvement/maintenance of the steam turbine 20 leading to efficiency improvement of the steam turbine 20 can be performed sooner than in the case of the conventional method, and thus, the present embodiment can suppress discharge of carbon dioxide gas, and can contribute to energy conservation and prevention of global warming.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of measuring a steam turbine, the method comprising:
    installing a measuring device into the inside of the steam turbine through an inspection hole or a manhole of the steam turbine or an inspection hole or a manhole of a condenser connected to the steam turbine, when the steam turbine is halted; and
    measuring a position and a dimension of an axial key or a center key of the steam turbine by using the measuring device, without opening a turbine casing of the steam turbine,
    wherein the turbine casing has a turbine outer casing and a turbine inner casing;
    wherein the axial key is a pillar-shaped projection provided inside the turbine outer casing or outside the turbine inner casing;
    wherein the axial key is engaged with a groove of a first key groove member provided outside the turbine inner casing or inside the turbine outer casing;
    wherein the center key is a pillar-shaped projection provided inside the turbine outer casing or outside the turbine inner casing; and
    wherein the center key is engaged with a groove of a second key groove member provided outside the turbine inner casing or inside the turbine outer casing.

2. The method of measuring the steam turbine according to claim 1,
    wherein the measuring device is a contact-type measuring device.

3. The method of measuring the steam turbine according to claim 1,
    wherein the installing the measuring device includes fixing the measuring device to a bolt or a bolt hole provided in the inspection hole or the manhole via a tool.

4. The method of measuring the steam turbine according to claim 1,
    wherein the steam turbine has a turbine rotor and a turbine inspection hole,
    wherein, in the installing, the measuring device is installed on a turbine inspection hole side in relation to the turbine rotor, and
    wherein, in the measuring, a position and a dimension of the axial key are measured.

5. The method of measuring the steam turbine according to claim 1,
    wherein the steam turbine has a turbine rotor and a turbine inspection hole,
    wherein, in the installing, the measuring device is installed on a turbine rotor side in relation to the turbine inspection hole, and
    wherein, in the measuring, a position and a dimension of the center key are measured.

6. The method of measuring the steam turbine according to claim 1,
    wherein the installing the measuring device includes fixing the measuring device to a strength member of the turbine casing via a tool.

7. The method of measuring the steam turbine according to claim 6,
wherein the tool has at least one of a prismatic joint or a rotating joint.

8. The method of measuring the steam turbine according to claim 1,
wherein the measuring device is a non-contact type measuring device.

9. The method of measuring the steam turbine according to claim 8,
wherein the non-contact type measuring device is a laser scanner or an infrared camera.

10. The method of measuring the steam turbine according to claim 8,
wherein the non-contact type measuring device is an arm-type three-dimensional measuring instrument.

11. A measuring device of a steam turbine, comprising:
a support table fixed to a strength member of a turbine casing of the steam turbine or to a bolt or a bolt hole provided in an inspection hole or a manhole of the steam turbine;
a first arm having an end connected to the support table;
a joint connected to the other end of the first arm; and
a second arm having an end connected to the joint; and
a measuring instrument connected to the other end of the second arm, inserted into the inside of the steam turbine, and measuring a position and a dimension of an axial key or a center key.

12. The measuring device of the steam turbine according to claim 11,
wherein the measuring instrument is a laser scanner or an infrared camera.

13. The measuring device of the steam turbine according to claim 11,
wherein the turbine casing has a turbine outer casing and a turbine inner casing;
wherein the axial key is a pillar-shaped projection provided inside the turbine outer casing or outside the turbine inner casing;
wherein the axial key is engaged with a groove of a first key groove member provided outside the turbine inner casing or inside the turbine outer casing;
wherein the center key is a pillar-shaped projection provided inside the turbine outer casing or outside the turbine inner casing; and
wherein the center key is engaged with a groove of a second key groove member provided outside the turbine inner casing or inside the turbine outer casing.

14. The measuring device of the steam turbine according to claim 13,
wherein the steam turbine has a turbine rotor and a turbine inspection hole, and
wherein the measuring instrument is inserted into a turbine inspection hole side in relation to the turbine rotor, and a position and a dimension of the axial key are measured.

15. The measuring device of the steam turbine according to claim 13,
wherein the steam turbine has a turbine rotor and a turbine inspection hole; and
wherein the measuring instrument is inserted into a turbine rotor side in relation to the turbine inspection hole, and a position and a dimension of the center key is measured.

16. A method of manufacturing a steam turbine, the method comprising:
installing a measuring device into the inside of the steam turbine through an inspection hole or a manhole of the steam turbine or an inspection hole or a manhole of a condenser connected to the steam turbine, when the steam turbine is halted;
measuring a position and a dimension of an axial key or a center key of the steam turbine by using the measuring device, without opening a turbine casing of the steam turbine;
manufacturing a component for the steam turbine using the measured position and dimension; and
replacing a component of the steam turbine with the manufactured component.

17. The method of manufacturing the steam turbine according to claim 16,
wherein the measuring device has:
a support table fixed to a strength member of a turbine casing of the steam turbine or a bolt or a bolt hole provided in an inspection hole or a manhole of the steam turbine;
a first arm having an end connected to the support table;
a joint connected to the other end of the first arm;
a second arm having an end connected to the joint; and
a measuring instrument connected to the other end of the second arm, inserted into the inside of the steam turbine, and measuring a position and a dimension of an axial key or a center key.

18. The method of manufacturing the steam turbine according to claim 17,
wherein the measuring instrument is a laser scanner or an infrared camera.

19. The method of manufacturing the steam turbine according to claim 17,
wherein the turbine casing has a turbine outer casing and a turbine inner casing;
wherein the axial key is a pillar-shaped projection provided inside the turbine outer casing or outside the turbine inner casing;
wherein the axial key is engaged with a groove of a first key groove member provided outside the turbine inner casing or inside the turbine outer casing;
wherein the center key is a pillar-shaped projection provided inside the turbine outer casing or outside the turbine inner casing; and
wherein the center key is engaged with a groove of a second key groove member provided outside the turbine inner casing or inside the turbine outer casing.

* * * * *